United States Patent [19]
Spear et al.

[11] 3,770,420
[45] Nov. 6, 1973

[54] MELTING ALUMINUM UNDER SPECIAL FLOW CONDITIONS

[75] Inventors: Robert E. Spear, Murrysville; Robert J. Ormesher, Leechburg; Herbert M. Short, Pittsburgh, all of Pa.

[73] Assignee: Aluminum Company of America, Pittsburgh, Pa.

[22] Filed: July 29, 1971

[21] Appl. No.: 167,205

[52] U.S. Cl. ................................ 75/68 R, 75/65 R
[51] Int. Cl. .......................................... C22b 21/00
[58] Field of Search .................... 75/68 R, 50, 65 R, 75/46, 43; 266/33

[56] References Cited
UNITED STATES PATENTS

| | | | |
|---|---|---|---|
| 2,089,742 | 8/1937 | Garwin | 75/68 R |
| 2,465,544 | 3/1949 | Marsh | 75/68 R |
| 2,528,208 | 10/1950 | Bonsack et al. | 75/68 R |
| 2,987,391 | 6/1961 | Foster et al. | 75/68 R |
| 3,085,124 | 4/1963 | Upton | 75/68 R |
| 3,211,546 | 10/1965 | Kozma | 75/65 R |
| 3,276,758 | 10/1966 | Baker et al. | 266/33 R |
| 1,089,377 | 3/1914 | Hibbard | 266/33 R |
| 2,204,173 | 6/1940 | Bowser | 266/33 R |
| 2,610,218 | 9/1952 | Lang | 266/33 R |
| 3,260,592 | 7/1966 | Davey et al. | 75/78 |
| 3,510,116 | 5/1970 | Harvill et al. | 75/46 |
| 3,650,730 | 3/1972 | Derham | 75/68 R |

FOREIGN PATENTS OR APPLICATIONS

| | | | |
|---|---|---|---|
| 785,337 | 10/1957 | Great Britain | 75/46 |

Primary Examiner—L. Dewayne Rutledge
Assistant Examiner—M. J. Andrews
Attorney—Carl R. Lippert

[57] ABSTRACT

Solid aluminum charge is melted by contact with superheated molten aluminum in a charging bay or compartment. The molten aluminum is heated in a separate bay wherein special flow conditions are maintained to improve the rate of heat input to the melt. The temperatures exiting the heating and charging bays are also controlled.

11 Claims, 3 Drawing Figures

MELTING ALUMINUM UNDER SPECIAL FLOW CONDITIONS

BACKGROUND OF THE INVENTION

In the melting of solid aluminum scrap, ingot or other suitable charge is desirably heated as quickly as possible to provide the highest possible melting rate. In current practice the solid metal charge is introduced to a molten heel in a furnace normally in a ratio of about 2 pounds solid to 1 pound liquid heel after which heat is applied to the mixture most often from above, to melt the solid portion. Problems occur in these arrangements in that heat input to the solid charge is curtailed by a number of factors. It is difficult to rapidly transfer heat into solid pieces of aluminum without producing high surface temperatures in the solid pieces. This results in an accelerated oxidation rate which then produces a substantial amount of oxide skim which floats on the melt and poses an insulating barrier to the transfer of further heat. Even where most of the metal is molten the relatively low thermal conductivity of liquid aluminum interferes with distributing incoming heat so as to melt the solid pieces present. As a result the molten metal in a melting furnace normally experiences thermal stratification in which the surface temperature can be as high as 1,000°F hotter than the average temperature below the surface. This high temperature causes rapid oxidation and the resulting skim, an insulator, further reduces melting rate and increases melt loss. Also, since the heat cannot readily be utilized in the metal it tends to heat up the furnace to temperatures often approaching 3,000°F or more. This results in a deterioration of the furnace refractory linings which in turn necessitates reducing the rate of heat application which, in turn, further reduces the heat input into the aluminum charge. Because of the very high surface temperatures reached and the attendant large skim formation rate, heating must be further interrupted to permit removal of the insulating skim. The foregoing factors all cooperate to reduce melting rates.

It has been proposed to employ separate metal charging and melting bays or compartments connected by a loop through which molten metal is circulated. The approach here is to utilize the improved heat transfer between moving molten metal and solid charge pieces. Heat is applied to the molten metal in one compartment so that it can be transferred to the solid charge in the other compartment. However, to date these circulating loop arrangements have had limited success largely because of the poor thermal conductivity of the molten aluminum used to melt the solid charge. If the heat is not efficiently utilized the temperatures climb and the same problems are encountered as were discussed above in connection with single charging furnaces although to a slightly lesser extent. In addition to the circulating loops, rocking or rolling arrangements have also been tried but without much success in melting aluminum. Because of such limited success the more elaborate arrangements have been discarded in favor of the batch single furnace heating of a largely solid charge.

DESCRIPTION OF THE PREFERRED EMBODIMENTS

In accordance with the invention a circulating loop is used to melt solid aluminum charge. The loop contains both heating and charging bays or receptacles connected in a loop provided with some means such as a pump for promoting circulation therethrough. Special molten metal flow characteristics are provided for to overcome the disadvantages in the previous methods of melting aluminum.

In this description reference is made to the drawings in which.

The figures are largely schematic and are not intended to depict structural details.

Figure 1:
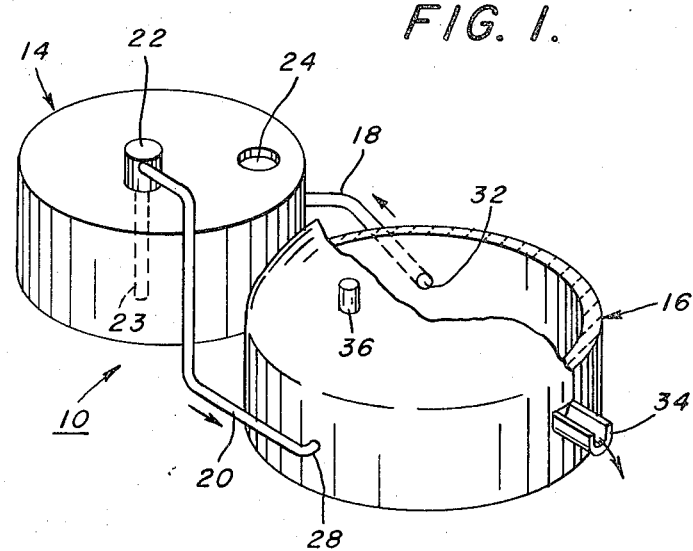
FIG. 1 is an isometric view of an arrangement suitable in practicing the invention.

Referring to FIG. 1 there is shown a circulation loop 10 having a charging bay 14 and a heating bay 16 interconnected by heat supply line 18 and return line 20 to provide a circulating loop. A pump 22 is provided to circulate molten metal through the loop. The charging bay or receptacle 14 is provided with a charge port or opening 24 which may be equipped with a cover or lid not shown. The charging port, of course, is for introducing solid charge pieces into the charging bay 14. The heat supply line 18 is arranged to enter the charging bay 14 at a relatively high elevation, normally within the upper one-half of the melt body within charging bay 14 and preferably within the upper one-third of the molten body therein. Molten metal is removed from charging bay 14 normally at a relatively low elevation in the melt, below the midpoint and preferably within the lower one-third of the melt depth. In the arrangement depicted the inlet 23 for pump 22 is shown terminating at an elevation near the bottom of charging bay 14. The pump 22 is shown at the outlet of the charging bay where the molten metal is at its lowest temperature which is a convenient and preferred location although the pump could be situated elsewhere. Alloy additions may be made in the charging furnace such that the improved arrangement may function as both a melting and alloying furnace if desired. The excellent mixing accomplished with this arrangement is illustrated by a test in which an addition of 2% Mg made to an alloy already containing 2% Mg to form a 4% Mg alloy was diffused throughout the entire system in only four minutes.

The heating bay 16, like the charging bay 14, has an inlet 28 and outlet 32 for the circulation loop. The inlet 28 is shown as situated well below the midpoint of the melt depth so that metal from the pump is directed across the heating bay bottom as explained hereinafter. Inlet location in the lower one-third of the melt depth is satisfactory although it may be preferred to introduce the incoming metal in a stream substantially at the bottom of the heating bay, within 8 inches of the bottom surface. Other arrangements for introducing molten metal to the heating bay are also useful and in some cases preferred. For instance, metal can be introduced through a pipe passing through the top melt surface. The pipe discharge is situated below the melt surface so as not to cause surface agitation. The pipe may enter the melt toward one end of the bay and at an angle of about 30° from the vertical as illustrated by dotted line pipe 29 in FIG. 3. In such an arrangement the bottom 33 of the heating bay 16 can have a curved or spherical shape similar to that shown for the top 35 of the bay. As explained hereinafter these arrangements for molten metal introduction provide the required heating bay flow patterns in accordance with the invention. The outlet 32 for the circulating loop is situated within the uppermost one-third of the molten metal depth in the heating bay. In addition to the circulating loop connections in the heating bay there is situated a drain or tap 34 through which is removed molten metal for ingot casting or other desired purposes. The drain or tap outlet 34 is situated within the lower one-half of the heating bay melt depth and may be an open trough as shown in FIG. 1 or a closed pipe where desired.

In the heating bay a plurality of heating means, 36 typical, are provided to heat the melt. Heating means which are suitable include surface or submerged type heaters. A typical above surface heater 36 is depicted schematically in FIG. 3 and consists of a combustion burner situated above the melt surface, heat being applied through the surface and into the body of the melt. Submerged heating means such as heating tubes can also be employed within the melt body although the above surface combustion heaters are usually the most economical.

Figure 2:
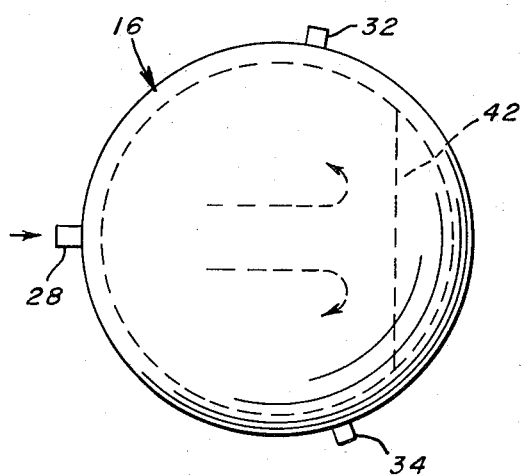
FIG. 2 is a plan view of the heating bay shown in FIG. 1.
Figure 3:
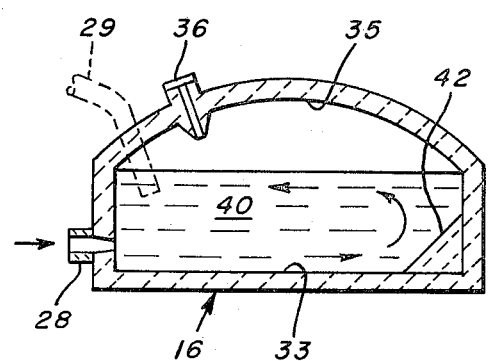
FIG. 3 is an elevation view of the heating bay shown in FIG. 1.

In accordance with the invention heat transfer effects in the heating bay are markedly improved, doubled or even tripled, over those previously achieved by a relatively uncomplicated system which is now described. Referring to FIGS. 2 and 3 it is highly important that molten metal returning through the circulation loop from the charging bay 14 through return line 20 and into the heating bay 16 be introduced into the melt therein in such a manner as to provide continuous multi-directional subsurface molten metal movement throughout the melt without substantial agitation of the melt surface. This is accomplished by causing the incoming molten metal to sweep across the melt bottom and then move upwardly and then sweep across the region just below the melt surface in a direction opposite the bottom sweep. In some cases the flow reversal has both horizontal and vertical aspects. Referring to FIGS. 2 and 3, the incoming stream is spread laterally to spread the sweeping effect since it is important that the sweeping effects traverse substantially the entire bottom and top melt regions. In FIG. 2 the arrows are intended to depict that this substantially reversed flow is not necessarily exactly 180° opposite the incoming flow but that it can be more or less than 180°, although, in any event, it is quite substantial. Referring to FIG. 3, it can be seen that the flow reversal has a very substantial vertical aspect as it moves upwardly through a curved or arcuate path and then backwardly in a direction substantially opposite the incoming flow. As indicated earlier molten metal may be introduced through the surface of the melt as by pipe 29 in FIG. 3. It is essential that such a pipe be positioned to facilitate metal introduction into the melt bottom to facilitate the essential bottom half of the dual sweeping action. In a melt 2½ feet deep the pipe might discharge 6 inches below the melt surface at an angle of 30° from the vertical at one end of the bay. A deeper melt would require a downward adjustment of the discharge. A spherical bottom for compartment 16 is often helpful in aiding the sweeping action for introduction through the melt surface especially where the angle of introduction becomes less than 60° from the vertical.

Thus the incoming flow to the heating bay which is at a relatively low temperature sweeps across substantially the entire bottom of the heating bay and is moved upwardly and usually laterally to effect substantial reversal of flow direction. This provides a highly vigorous sweeping across the surface region, that is the region immediately below the upper surface boundary of the melt, with relatively cool metal from the lower heating bay portions and the charging bay. This sweeping across the surface region most significantly is effected without any substantial breaking or other disturbance of the surface boundary thus avoiding oxide film generation.

The streams exiting the heating bay preferably are situated in a transverse or lateral position with respect to the sweep flow. This minimizes short circuiting or other disturbance of the desired flow pattern within the melt. For instance, the return flow to the charging bay and the melt product streams can be positioned at 90° with respect to the incoming flow and may suitably be positioned on opposite sides of the heating bay. In FIG. 2 the loop exit 32 is oriented at about 100° and the product tap 34 is about 120° with respect to the axis of the incoming stream entry 28. Usually the exit streams from the heating bay should be positioned from about 45° to about 135° from the entrance stream axis.

The dual sweeping actions are believed to cause the markedly improved heat transfer effects observed in the improved heating bay. That is, disproportionate concentration of hot metal in the surface region and the heat transfer problems associated with such temperature concentrations are substantially avoided. Obviously the sweeps involve major portions of the metal within and entering the heating chamber as minor or miniscule portions would not sufficiently alter conditions to achieve the improvements derived from the invention. It is also desired that the molten metal returning to the charging bay is the hottest available from the heating bay in order to maximize transfer of heat to the charging bay. These goals are accomplished by the flow patterns here described which do not invert the natural thermal gradient which places the hottest melt in the upper regions, but rather substantially completely eliminate the extreme and disproportionate concentrations of heat associated with previous melt heating practices.

The depth of the melt in the heating bay exerts considerable influence on the flow therethrough. A minimum depth of one foot should be maintained for proper flow. A maximum depth of 3 or 3½ feet is desired although a depth of 4 feet is suitable on a less preferred basis.

The flow considerations just described were developed by extensive tests utilizing scale models and water containing particles with density similar to water to simulate flow conditions in a heating bay. Experiments were conducted to determine how to best obtain extremely vigorous washing or sweeping of substantially the entire underside of the top surface boundary without actually breaking or seriously disturbing the surface. The experiments included the use of a rectangular heating bay shape which was found unacceptable because of stagnation observed in the corners. While a rectangular shape was found unacceptable an octagonal shape was found acceptable. Thus a substantially circular shape such as shown in the figures is normally preferred but polygonal shapes are also acceptable although angles included between adjoining sides should not be less than 135°. Tangential flow introduction into the heating bay resulted in a whirlpool effect and substantial stagnation in the center which practically eliminated any vertical or upward flow within the receptacle. The tests clearly indicated that it is essential that flow introduction to the heating bay be such as to effect a sweeping action across the bottom of the bay and that this sweep flow be turned upwardly through an arc to reverse the direction of the sweep flow as it proceeds across the surface region. While the flow may have secondary eddy or circular aspects its predominant characteristic is a sweeping action along the bay bottom which could be considered a predominantly directional flow with secondary lateral or eddy effects. These secondary effects, by the way, are themselves desirable since they spread the incoming flow so that the sweeping action traverses substantially the entire bay width, the dimension transverse to the direction of sweep flow. This type of flow is enhanced by introduction in a direction normal to the receptacle as opposed to oblique or tangential when viewed in a plan view.

In the heating bay the molten metal is heated and exits through heated metal supply line 18 at about from 1,375° to 1,550°F although preferably not over 1,475°F. Because of the markedly improved subsurface heat transfer achieved in practicing the invention, the highest temperature within the heating bay melt 40 never exceeds 1,700°F even where heat is applied above the melt surface which previously presented problems in that the melt surface often reached temperatures well over 2,500°F. The improved method with its marked decrease with respect to its maximum temperature results in markedly reduced oxide skim formation rates and excellent heat transfer through the melt surface. Heat can be applied substantially continuously in heating bay 16 since there is practically no oxide skim formed there and, accordingly, no need to interrupt heating for skim removal. Thus charging in the charging bay 14 and molten metal pouring or tapping through outlet 34 can proceed continuously. Of course, some interruption may occur because of situations which arise in casting and other operations which simply means that pouring through product outlet 34 is interrupted and the heat application through heaters 36 reduced or, where capacity permits, the charging rate through charging port 24 maintained to counter balance the heat application in the heating bay. This latter choice, of course, requires reserve capacity for the melt which accumulates. In the charging bay 14, solid pieces of aluminum are dropped into the port 24 whence they fall into the molten metal moving through the bay which, of course, tends to extract heat from the molten metal.

In the practice of the invention the molten metal temperature in the charging bay exit line 20 is maintained at a temperature of between 1,300° and 1,375°F although temperatures up to 1,450°F may be acceptable. As indicated above the temperature of the molten aluminum exiting the heating bay is 1,375° to 1,475°F. The temperature difference between the two is always at least 50°F and preferably at least 80°F, with a difference of 100°F or more being highly preferred. The temperatures are controlled by properly adjusting the heat input into heating bay 16 in conjunction with the rate of charge into the charging bay 14 and the melt circulation rates. For substantially continuous operation under stable conditions the charging rate is the same as the melted product discharge rate through line 34. Increasing the charging rate tends to lower temperatures. Increasing both charging rate and heating increases the temperature differential between the exit streams of the respective bays. Increasing the melt recirculation rate decreases this differential. Thus the respective temperatures are readily controlled although once the desired conditions are reached little or no manipulation is necessary and charging and tapping proceed without instability or interruption. The amount of molten metal circulated through the loop is usually at least 10 times the amount of solid charge introduced into the charging bay 14, on a weight basis, although a weight ratio of at least 15 or 20 is preferable.

The invention has been described with particular reference to the melting of aluminum to which it is extremely well suited. However, it is believed that many of the features and advantages of the invention should be applicable to melting other metals such as magnesium.

The invention has been described in terms of certain preferred embodiments but the scope of the claims is intended to encompass all embodiments which fall under the spirit of the invention.

What is claimed is:

1. A method of heating molten metal comprising:
   1. maintaining a melt body having an upper unconfined melt surface.
   2. applying heat to said melt through said upper melt surface,
   3. continuously introducing a cool molten metal stream into the melt and under sufficient force as to sweep major portions of cool molten metal across the bottom portions of the melt and upwardly through an arc to effect a substantial sweep flow reversal and a vigorous sweeping of the upper melt region just below said heated upper melt surface with cool molten metal from said cool molten metal stream and the lower melt portions, said vigorous sweeping being substantially without any substantial disturbance of said upper melt surface, and
   4. continuously removing heated molten metal from the upper regions of said melt.

2. The method according to claim 1 wherein the melt body is maintained at a depth of 1 foot to 3½ feet.

3. The method according to claim 1 wherein aid melt is confined laterally by a plurality of surfaces describing included angles of not less than 135°.

4. The method according to claim 1 wherein said melt is confined laterally by substantially right cylindrical surfaces.

5. The method according to claim 1 wherein the removal of heated metal from the upper regions of the melt in said step 4 occurs at a point transversely displaced and oriented with respect to the cool molten metal stream introduced into said melt.

6. The method according to claim 1 wherein said molten metal is molten aluminum.

7. A method of melting aluminum comprising:
   1. substantially continuously circulating molten aluminum through a loop including a receptacle for charging solid metal, a receptacle for heating molten metal and means for circulating molten metal through said loop,
   2. maintaining a melt in said heating receptacle and applying heat to said melt in said heating receptacle,
   3. continuously introducing cool molten aluminum from said charging receptacle into said heating receptacle under sufficient force as to sweep major portions of cool molten aluminum across the bottom portions of said melt and upwardly in an arcuate path to effect a substantial reversal of the sweep flow direction, thereby to effect a vigorous sweeping of the upper melt region just below the heated upper melt surface with cool molten metal from said stream and from the lower melt portions, said vigorous sweeping being substantially without any substantial disturbance of said melt surface, 4. continuously removing a heated aluminum stream from the upper regions of said melt in said heating receptacle and introducing said stream into said charging receptacle and further introducing solid metal charge to said charging receptacle said charge being introduced at a weight ratio of one part to at least 10 parts molten aluminum, and 5. continuously removing a molten aluminum product from said heating receptacle.

8. The method according to claim 7 wherein said molten aluminum product is removed from said heating receptacle at a position substantially transverse to the major direction of said sweep flow.

9. The method according to claim 7 wherein said cool molten aluminum is maintained at a temperature of 1,300° to 1,375°F, said heated aluminum stream is maintained at 1,375° to 1,475°F and the difference between cool and heated aluminum streams is maintained at a minimum of 50°F.

10. The method according to claim 7 wherein said heated aluminum stream in said step 4 exits said heating receptacle at a position substantially transverse to the major direction of said sweep flow.

11. The method according to claim 10 wherein said transverse position is within 45° to 135° of the major direction of sweep flow.

* * * * *